United States Patent
Velusamy et al.

(10) Patent No.: US 9,408,199 B1
(45) Date of Patent: Aug. 2, 2016

(54) METHOD AND SYSTEM FOR PROVIDING AIR-INTERFACE RESOURCE INFORMATION IN A DATA PACKET

(71) Applicant: Sprint Spectrum L.P., Overland Park, KS (US)

(72) Inventors: Saravana Velusamy, Olathe, KS (US); Deveshkumar Rai, Overland Park, KS (US); Rajil Malhotra, Olathe, KS (US); Suryanarayanan Ramamurthy, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 12 days.

(21) Appl. No.: 14/200,734

(22) Filed: Mar. 7, 2014

(51) Int. Cl.
*H04W 72/04* (2009.01)

(52) U.S. Cl.
CPC .................................. *H04W 72/0413* (2013.01)

(58) Field of Classification Search
None
See application file for complete search history.

(56) References Cited

U.S. PATENT DOCUMENTS

| | | | |
|---|---|---|---|
| 7,215,942 B1 | 5/2007 | McQuaide et al. | |
| 2007/0109956 A1* | 5/2007 | Kwon et al. | 370/208 |
| 2007/0179974 A1 | 8/2007 | Cai et al. | |
| 2011/0225281 A1 | 9/2011 | Riley et al. | |
| 2011/0291882 A1* | 12/2011 | Walsh et al. | 342/357.29 |
| 2011/0294435 A1 | 12/2011 | Miller | |
| 2012/0092992 A1 | 4/2012 | Pappas et al. | |
| 2013/0029710 A1* | 1/2013 | Nakamura | 455/509 |
| 2013/0107702 A1 | 5/2013 | Gupta et al. | |
| 2014/0115654 A1* | 4/2014 | Rogers et al. | 726/1 |
| 2014/0169375 A1* | 6/2014 | Khan et al. | 370/392 |
| 2014/0233479 A1* | 8/2014 | Dahod et al. | 370/329 |
| 2015/0016299 A1 | 1/2015 | Zhang et al. | |
| 2015/0036687 A1* | 2/2015 | Belling | 370/392 |
| 2015/0245238 A1 | 8/2015 | Zhang | |
| 2016/0112742 A1 | 4/2016 | Skarp | |
| 2016/0112896 A1 | 4/2016 | Karampatsis et al. | |

OTHER PUBLICATIONS

First Action Interview Pilot Program Pre-Interview Communication for U.S. Appl. No. 14/244,423, dated Aug. 21, 2015.
Office action dated Jun. 9, 2016, for U.S. Appl. No. 14/300,284.

* cited by examiner

*Primary Examiner* — Chi H Pham
*Assistant Examiner* — Shick Hom (57) ABSTRACT

One embodiment takes the form of a method carried out by a base station. The method includes the base station serving a wireless communication device (WCD) on a given air-interface resource. While serving the WCD, the base station may receive a data packet from the WCD. In response, the base station may update the data packet to include an indication of the given air-interface resource on which the base station is serving the WCD. The base station may then transmit the updated data packet for receipt by one or more gateways.

15 Claims, 5 Drawing Sheets

METHOD AND SYSTEM FOR PROVIDING AIR-INTERFACE RESOURCE INFORMATION IN A DATA PACKET

BACKGROUND

Unless otherwise indicated herein, the materials described in this section are not prior art to the claims and are not admitted to be prior art by inclusion in this section.

Wireless service providers may operate access networks each arranged to provide wireless communication devices (WCDs) such as cell phones, tablet computers, tracking devices, embedded wireless modules, and other wirelessly equipped communication devices, with wireless communication service. Each such access network may include a number of base stations that radiate to define an air interface over which to provide wireless service to WCDs according to an agreed air-interface protocol, such as Orthogonal Frequency Division Multiple Access (OFDMA (e.g., Long Term Evolution (LTE) or Wireless Operability for Microwave Access (WiMAX)), Code Division Multiple Access (CDMA) (e.g., 1xRTT and 1xEV-DO), WIFI, and BLUETOOTH, or others now known or later developed. In turn, each base station may be coupled with network infrastructure that provides connectivity with one or more transport networks, such as the public switched telephone network (PSTN) and/or the Internet for instance. With this arrangement, a WCD within coverage of the access network may engage in air-interface communication with a base station and may thereby communicate via the base station with various remote network entities and/or with other WCDs served by the base station or by other base stations.

In accordance with an agreed air-interface protocol, the air interface provided by the access network may be comprised of various air-interface resources that are utilized by the base stations to serve WCDs. For instance, each base station may radiate to define one or more air-interface coverage areas, such as cells and cell sectors, in which WCDs can operate and engage in air-interface communication with the base station. Within each air-interface coverage area, the base station may operate on one or more carrier frequencies (or "carriers"), each defining a frequency channel for communicating with WCDs. In a typical example, the base station's one or more carriers may each take the form of a particular frequency block (e.g., a 1.25 MHz, 5 MHz, or 10 MHz block) in a profile frequency band used by the wireless service provider, such as a 800 MHz band, a 1.9 GHz band, or a 2.5 GHz band.

In practice, each of the base station's one or more frequency channels may be divided into a downlink (or forward link) for carrying communications from the base station to WCDs and an uplink (or reverse link) for carrying communications from WCDs to the base stations. For example, according to some air-interface protocols, each frequency channel may be divided over frequency into a first block of frequency for downlink communications and a second block of frequency for uplink communications. Alternatively, according to other air-interface protocols, each frequency channel may be divided over time into a first set of timeslots for carrying downlink communications and a second set of timeslots for carrying uplink communications. Other techniques for dividing a frequency channel into a downlink and uplink may exist as well. Further, the agreed air-interface protocol may employ techniques such time-division multiplexing, frequency-division multiplexing, and/or code-division multiplexing to further divide a frequency channel's downlink and/or uplink into discrete sub-resources (e.g., LTE resource blocks, 1xEV-DO forward-link timeslots and/or reverse-link channels, etc.), which may then be used to carry control and/or bearer data between the base station and WCDs on the frequency channel.

In operation, each base station may be configured to broadcast, on each of its one or more frequency channels, (1) a list of the frequency channel(s) provided by the base station and (2) a pilot (or reference) signal that WCDs are configured to monitor in order to evaluate coverage strength (e.g., signal strength and/or signal to noise ratio). For example, in a representative LTE system, each base station may broadcast, on each of its one or more frequency channels, a system information block (SIB) message that lists the frequency channels on which the base station provides service and a reference signal that LTE-compliant WCDs are arranged to monitor in order to evaluate LTE coverage provided by the base station. As another example, in a representative CDMA system, each base station may broadcast, on each of its one or more frequency channels, a channel list message (CLM) that lists the frequency channels on which the base station provides service and a pilot signal that CDMA-compliant WCDs are arranged to monitor in order to evaluate CDMA coverage provided by the base station. Other examples are possible as well.

When a WCD first enters into coverage of an access network, the WCD may then automatically scan the air interface in an effort to find the strongest available pilot signal, and the WCD may then register with the access network over the frequency channel associated with that pilot signal. For instance, the WCD may generally scan through various frequency channels and evaluate any pilot signals on those frequency channels in order to identify the frequency channel having the strongest pilot signal. In turn, the WCD may engage in registration signaling with the access network on that frequency channel in order to register with the access network. At some later time, the access network can then assign the WCD certain resources on the frequency channel and begin exchanging bearer data with the WCD.

Overview

In access networks such as those described above, wireless service providers may also employ entities that are configured to manage and enforce service policy rules for WCDs operating in the access network, such as rules defining a quality of service provided to WCDs over the access network's air interface (e.g., data rate, communication quality, etc.), permissions and/or restrictions associated with the service provided to WCDs over the access network's air interface (e.g., access control rules or content filtering rules), and/or a configuration of the access network when serving the WCD. For instance, in one implementation, an access network may include a policy decision point (PDP) that manages the service policy rules and a policy enforcement point (PEP) that enforces those service policy rules. However, various other implementations are possible as well.

In some circumstances, it may be desirable for these access networks to apply service policy rules for a given WCD that are based on the particular air-interface resources that are presently being used to serve the given WCD. For example, as noted above, an access network may be serving the given WCD on one of several different frequency bands, and each of these frequency bands may provide a different capacity for serving WCDs (e.g., the 2.5 GHz band may have more capacity than the 1.9 GHz band, the 1.9 GHz band may have more capacity than the 800 MHz band, etc.). Thus, the access network may wish to apply service policy rules that depend on the frequency band being used to serve the given WCD so as to help prevent the load on that particular frequency band from exceeding its capacity. Along similar lines, the access network may also wish to apply service policy rules that depend on other air-interface resources being used to serve the given WCD, such as a particular frequency channel on which the access network is serving the given WCD and/or a particular resource assigned to the given WCD on that frequency channel.

However, presently, service policy entities such as PDPs and PEPs are unable to implement these types of service policy rules because such entities do not receive information concerning the particular air-interface resources being used by the access network to serve WCDs. Disclosed herein is a method and corresponding system to address this issue.

According to embodiments of the disclosed methods, while serving a WCD on an air-interface resource, a base station in an access network may receive data packets from the WCD. In one implementation, upon receiving each such data packet, the base station may be configured to responsively update the data packet to include an indication of an air-interface resource being used to serve the WCD. In another implementation, upon receiving each such data packet, the base station may be configured to make a threshold decision of whether to update the received data packet to include an indication of an air-interface resource being used to serve the WCD. The base station may carry out this decision in various manners. As one example, the base station may decide to include such an indication periodically (e.g., after a given amount of time has passed and/or a given number of data packets have been received since last updating a data packet from the WCD to include such an indication). In another example, the base station may decide to include such an indication only in the first data packet received after the base station begins serving the WCD on a particular air-interface resource. Other examples are possible as well.

If the base station does update the data packet to include the indication of the air-interface resource being used to serve the WCD, the base station may then transmit the updated data packet for receipt by one or more gateways. In turn, the one or more gateways may use the indication of the air-interface resource to determine one or more service policy rules for the WCD.

In line with the discussion above, the indication of the air-interface resource on which the access network is serving the WCD may take various forms. As one example, the indication may be an indication of the particular frequency band on which the base station is serving the WCD. As another example, the indication may be an indication of the frequency channel on which the base station is serving the WCD, such as an identifier of the channel's carrier frequency of and/or the coverage area in which the frequency channel is being provided. As yet another example, the indication may be an indication of a particular resource(s) assigned to the WCD on the frequency channel, such the an identifier of a particular LTE resource block, a particular 1×EV-DO timeslot and/or reverse-link channel, etc. Other examples are possible as well. It should also be understood that the indication of the air-interface resource may be some combination of two or more indications.

Advantageously, the disclosed methods and systems may thus provide information to one or more gateways concerning the particular air-interface resource(s) being used by the access network to serve a given WCD, which the gateways may then use to employ policy rules.

One example embodiment of the disclosed methods may include (a) a base station serving a wireless communication device (WCD) on a given air-interface resource, (b) while serving the WCD, the base station receiving a data packet from the WCD, (c) after receiving the data packet, the base station updating the data packet to include an indication of the air-interface resource, and (d) the base station transmitting the updated data packet for receipt by one or more gateways.

The feature of the base station updating the data packet to include an indication of the given air-interface resource may take various forms. In one example, this feature may comprise adding the indication of the given air-interface resource to a header of the data packet, such as a general packet radio service tunneling protocol (GTP-U) extension header as an example.

Further, the one or more gateways may determine a set of service policy rules for the WCD based at least in part on the indication of the given air-interface resource. The one or more service policy rules may take various forms. As one example, the service policy rules may be based at least in part by the indication of the given air-interface resource. For instance, a given WCD may operate under a first set of service policy rules if it is being served by the base station on the 1.9 GHz band, a second set of service policy if it is being served by the base station on the 2.5 GHz band, and so on. These service policy rules may then define a quality of service to be provided to the WCD, such as a data rate (e.g., guaranteed bit rate, maximum bit rate, or best effort service quality), communication quality provided to the WCD (e.g., voice and/or data encoding quality), etc.

This example embodiment of the disclosed methods may also include other features. For example, the example embodiment may additionally include the base station further updating the data packet to include an indication of a load of the frequency channel and/or frequency band before transmitting the updated data packet for receipt by the one or more gateways. In such an example, the one or more service policy rules, may then be based at least in part by both the indication of the given air-interface resource and the indication of the load of the given air-interface resource.

Another example embodiment of the disclosed methods may include (a) at a gateway that provides connectivity between an access network and a transport network, receiving a data packet originated by a WCD being served by the access network, wherein the data packet includes an indication of a given air-interface resource on which the access network is serving the WCD, (b) the gateway determining a set of service policy rules for the WCD based at least in part on the indication of the given air-interface resource, and (c) the gateway providing service to the WCD in accordance with the determined set of service policy rules.

Also disclosed herein are structures configured to facilitate implementation of the disclosed methods. One embodiment of the disclosed structures may take the form of a base station that includes (a) a network communication interface configured to provide connectivity with a wireless carrier network, (b) a processing unit, (c) data storage, and (d) program instructions stored in the data storage and executable by the processing unit to carry out functions such as those disclosed herein. Another embodiment of the disclosed structures may take the form of a non-transitory computer readable medium having instructions stored thereon that are executable by a processing unit to carry out functions such as those disclosed herein.

These and other aspects and advantages will become apparent to those of ordinary skill in the art by reading the following detailed description, with reference where appropriate to the accompanying drawings. Further, it should be understood that this overview and other description throughout this document is provided merely for purposes of example and is not intended to limit the scope of the invention as claimed.

DETAILED DESCRIPTION

The present method and corresponding system will now be described with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

Referring to the drawings, as noted above, FIG. 1 is a simplified block diagram of an example network arrangement in which embodiments of the disclosed methods and entities can be implemented. As shown, the arrangement includes an access network 102 that functions to provide wireless communication devices (WCDs) with connectivity to one or more transport networks. In particular, the access network 102 is shown providing a representative WCD 104 with connectivity to a representative transport network 106. To facilitate providing this connectivity, the access network 102 may include one or more components that communicate with the WCD 104 and with the transport network 106 and that bridge those entities together to allow the WCD 104 to engage in communications with entities on the transport network 106.

Figure 1:
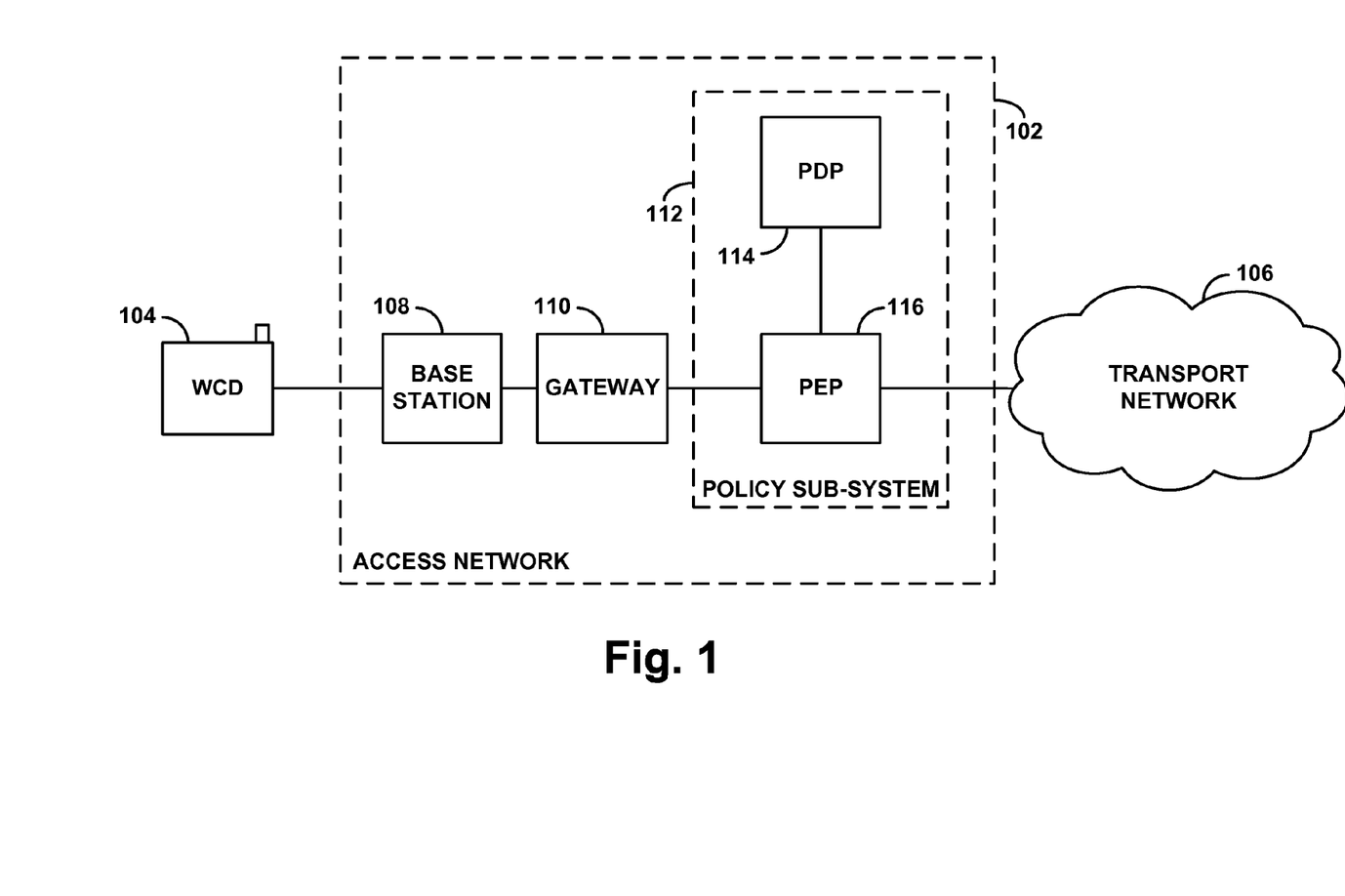
FIG. 1 is a simplified block diagram of an example network arrangement in which embodiments of the disclosed methods and entities can be implemented.

The access network 102 may be structured to provide various types of connectivity, such as wireless, circuit-switched, and/or packet-switched, for various types of communications, such as voice and/or data for instance. As a specific example, the access network 102 may be cellular wireless network that includes (1) a wireless base station 108 arranged to serve the WCD 104 in accordance with an air-interface protocol such as OFDMA (e.g., LTE or WiMAX), CDMA, WIFI, or the like, and (2) a gateway 110 that connects with a transport network such as the PSTN or the Internet. Representative WCD 104 may then be a device such as a cell phone, wirelessly-equipped computer, embedded wireless module, or the like, configured to be served wirelessly by such a base station and to engage in voice and/or data communication via the base station and the switch or gateway with entities on the PSTN or Internet. Other examples are possible as well.

The base station 108 may radiate to define one or more air-interface coverage areas, such as cells and cell sectors, in which the WCD 104 can operate and engage in air-interface communication with the base station 108. Within each air-interface coverage area, the base station 108 may operate on one or more carrier frequencies (or "carriers"). In a typical example, the base station's 108 one or more carriers may each take the form of a particular frequency block (e.g., a 1.25 MHz, 5 MHz, or 10 MHz block) in a profile frequency band used by the wireless service provider, such as a 800 MHz band, a 1.9 GHz band, or a 2.5 GHz band. Each carrier in each coverage area may then define a separate frequency channel over which the base station 108 may communicate with WCDs. As such, the base station's one or more frequency channels may be identified based on it carrier frequency and an identifier of the coverage area in which the frequency channel is provided (e.g., a PN offset, sector ID, etc.). (It should be understood, however, that a frequency channel may be identified in other manners as well.)

The one or more frequency channels of the base station 108 may take various forms. In one example, each of the base station's one or more frequency channels may be divided into a downlink (or forward link) for carrying communications from the base station 108 to the WCD 104 and an uplink (or reverse link) for carrying communications from the WCD 104 to the base station 108. For example, according to some air-interface protocols, each frequency channel may be divided over frequency into a first block of frequency for downlink communications and a second block of frequency for uplink communications. Alternatively, according to other air-interface protocols, each frequency channel may be divided over time into a first set of timeslots for carrying downlink communications and a second set of timeslots for carrying uplink communications. Other techniques for dividing a frequency channel into a downlink and uplink may exist as well.

Further, the agreed air-interface protocol may employ techniques such time-division multiplexing, frequency-division multiplexing, and/or code-division multiplexing to further divide a frequency channel's downlink and/or uplink into discrete sub-resources (e.g., LTE resource blocks, 1×EV-DO forward-link timeslots and/or reverse-link channels, etc.), which may then be used to carry control and/or bearer data between the base station 108 and the WCD 104 on the frequency channel.

The gateway 110 may generally function to provide connectivity between the access network 102 and the transport network 106. As such, the gateway 110 may take any form that enables it to carry out this function.

In line with the discussion above, the access network 102 may also be arranged to serve the WCD 104 with telecommunication service (e.g., connectivity to communicate on transport network 106) in accordance with a particular set of service policy rules, which may be used to define the type and/or level of service that may be provided to the WCD 104. For example, the access network 102 may employ service policy rules that define a quality of service to be provided to a given WCD, such as a data rate (e.g., guaranteed bit rate, maximum bit rate, or best effort service quality) and/or communication quality (e.g., voice and/or data encoding quality). As another example, the access network 102 may employ service policy rules that define restrictions (e.g., access control rules or content filtering rules) and/or allowances (e.g., entitlement to engage in certain services) for service(s) provided to a given WCD. The service policy rules may take other forms as well.

To facilitate this, the access network 102 may be programmed with, have access to, or otherwise maintain a record of the service policy rules and may apply those service policy rules as the access network 102 serves the WCD 104. For instance, as shown in FIG. 1, the access network 102 may include a policy-subsystem 112 that is configured to maintain and apply service policy rules such as these. This policy-subsystem 112 may take various forms. As one representative example, policy-subsystem 112 is shown as including (1) a policy decision point (PDP) 114 that generally functions to maintain a record of one or more sets of service policy rules that may be applied to the WCD 104 and (2) a policy enforcement point (PEP) 116 that functions to apply these rules as the access network serves the WCD 104. These entities may take various forms, and in some cases, may be implemented as functions of other access-network components (e.g., a controller or a gateway). Other examples are possible as well.

Figure 2:
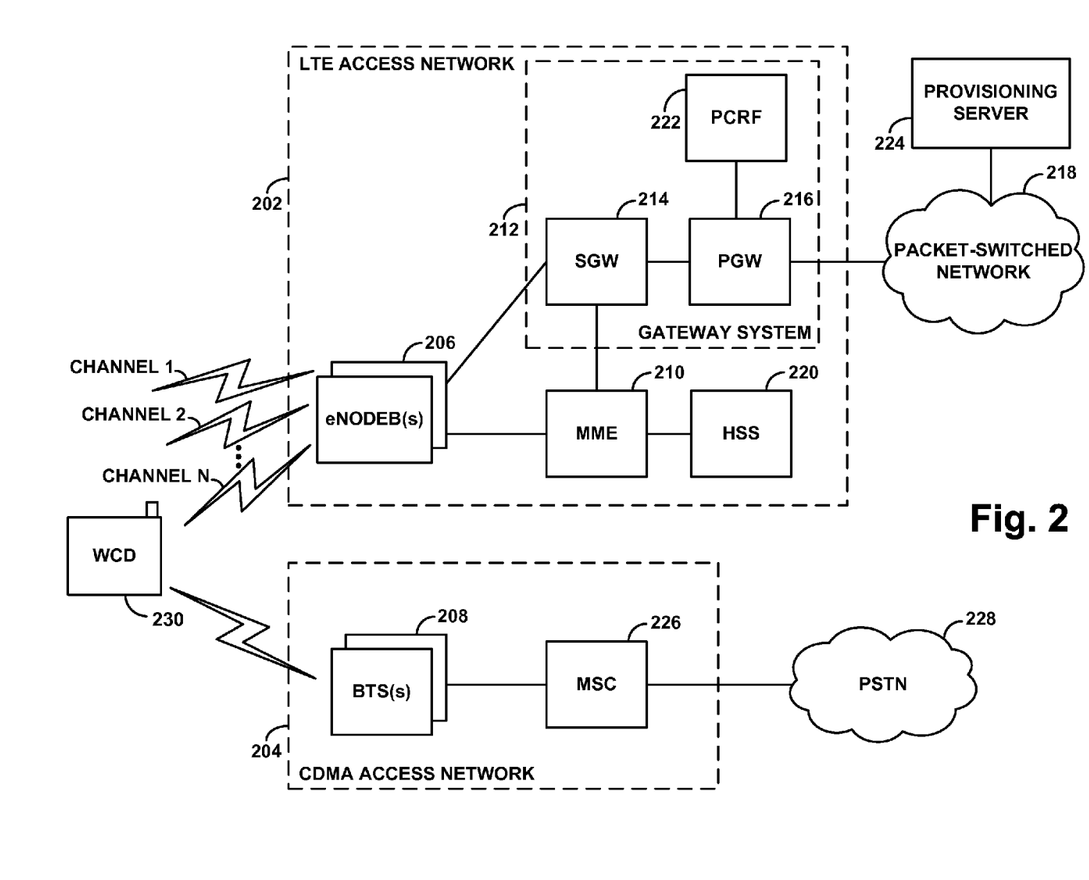
FIG. 2 is a simplified block diagram of another example network arrangement in which embodiments of the disclosed methods and entities can be implemented.

FIG. 2 is next a more specific but still simplified depiction of a network arrangement in which embodiments of the disclosed methods and entities can be implemented. In particular, the representative system includes an LTE access network 202 and a CDMA access network 204. It should be understood that these two types of access networks are just examples, and that the principles described can extend to apply with respect to any other types of access networks, such as wireless access networks operating in accordance with other air-interface protocols for instance.

As noted above, each of these access networks may include one or more base stations that radiate to provide one or more frequency channels on which to serve WCDs. By way of example, the LTE access network 202 is shown including one or more representative LTE base stations 206 known as eNodeBs, and the CDMA access network is shown including one or more representative CDMA base stations 208 known as a base transceiver stations (BTSs). Further, by way of example, the LTE access network 202 is shown defining a number of frequency channels denoted as Channels 1, 2, . . . N, and the CDMA access network 204 is shown defining a single representative frequency channel. Other arrangements are possible as well.

The frequency channels provided by the LTE and CDMA access networks may take various forms. For instance, in one representative implementation of the LTE access network 202, Channels 1, 2, . . . N may each include a downlink that takes the form of a 5 MHz, 10 MHz, or 20 MHz carrier-frequency channel, which is then further divided in both the time and frequency domains into "resource blocks," each taking the form of a timeslot having a duration of 0.5 milliseconds (ms) and spanning a set of twelve 15-kHz sub-carriers (for a total bandwidth of 180 kHz). These resource blocks may be assigned to particular WCDs such that each assigned resource block may carry control and/or bearer data intended for a particular WCD (or group of WCDs). Additionally, the resource blocks may also carry other information, such as shared control data (e.g., a reference signal for the given coverage area). Each frequency channel's uplink may then be configured in a similar manner. (As noted above, in other implementations of LTE, the downlink and uplink may be divided in the time domain rather than the frequency domain).

Further, in one representative implementation of the CDMA network 204, the frequency channel may include a 1.25 MHz carrier-frequency downlink that is divided in the time domain into timeslot resources, each having a length of 2048 chips and a duration of approximately 1.67 ms. Each downlink timeslot may then be further divided in the time domain into two 1024 chip half slots, each arranged to carry a 76 chip forward pilot channel, two 64 chip forward medium access control (MAC) channel segments, and two 400 chip forward data segments for carrying control and/or bearer data. These downlink timeslots may then be assigned to particular WCDs using MAC identifiers, such that each assigned timeslot may carry control and/or bearer data intended for a particular WCD (or group of WCDs). The frequency channel's uplink may be configured in a similar manner, although the uplink may alternatively be divided into code channels using "Walsh codes."

Each base station in the LTE and CDMA access networks may be configured to broadcast, on each of its frequency channels, a specification of the one or more frequency channels provided by the base station. This specification may take various forms, and may identify the base station's one or more frequency channels in various manners (e.g., using a combination of carrier frequency and coverage-area identifier). For instance, in the LTE access network 202, each eNodeB may broadcast a System Information Block #5 (SIB5) message that includes a frequency-channel list. And in the CDMA access network 204, each BTS may broadcast a Channel List Message (CLM) that includes a frequency-channel list.

Each illustrated access network then further includes network infrastructure that helps enable the access network to serve WCDs. For example, the LTE access network 202 includes (1) a mobility management entity (MME) 210 that functions as a controller for the LTE access network 202, and (2) a gateway system 212. The gateway system 212 further includes (1) a serving gateway (SGW) 214 and (2) a packet gateway (PGW) 216. The PGW 216 provides connectivity with a packet-switched network 218 such as the Internet. As shown, the MME 210 has an interface for communication with each of the eNodeBs 206 and an interface for communication with the gateway system 212. With this arrangement, the MME 210 can manage registration of WCDs with the LTE access network 202, paging of WCDs served by the LTE access network 202, and setup of bearer tunnels for WCDs served by the LTE access network 202 to allow those WCDs to engage in packet data communication on packet-switched network 218. The LTE access network 202 may further include a home subscriber server (HSS) 220 and a policy charging and rules function (PCRF) 222.

In line with the discussion above, the LTE access network 202 may also include a PDP and a PEP (or the like), which may be implemented in various manners. For instance, in one implementation, the HSS 220 may function as a PDP and the MME 210 may function as a PEP. According to this implementation, the HSS 220 may maintain a service profile record defining one or more service policy rules and may provide the MME 210 with service profile data when the WCD attaches to or is served by the LTE access network 202. The MME 210 may then store that service profile data and apply the service policy rules as the LTE access network 202 serves the WCD.

In another implementation, the PCRF 222 may function as a PDP and the PGW 216 may function as a PEP. According to this implementation, the PCRF 222 may maintain a service profile record defining one or more service policy rules and may provide the PGW 216 with that service profile data when the WCD attaches to or is served by the LTE access network 202. The PGW 216 may then store that service profile data and may apply the service policy rules as the LTE access network 202 serves the WCD.

In yet another implementation, the MME 210, HSS 220, PGW 216, and/or PCRF 222 could package one or more such service policy rules and send the package to a provisioning server 224 sitting on the packet-switched network 218, which may in turn provision the WCD with the one or more service policy rules.

CDMA access network 204, on the other hand, includes a mobile switching center (MSC) 226 that functions as a controller of the CDMA access network 204 and that also functions to provide connectivity with the PSTN 228. As shown, MSC 226 has an interface for communication (typically through a base station controller or radio network controller (not shown)) with the BTS 208. With this arrangement, the MSC 226 can manage registration of WCDs with the CDMA access network 204, paging of WCDs served by the CDMA access network 204, and setup of PSTN calls for WCDs served by the CDMA access network 204.

The MSC 226 may also be in communication with a PEP and PDP that are configured to maintain and apply the service policy rules for a given WCD, as discussed above.

Further shown in FIG. 2 is a representative WCD 230 positioned in coverage of both the LTE access network 202 and the CDMA access network 204. Such a WCD 230 may be configured to support being served concurrently by both the LTE access network 202 and the CDMA access network 204. For instance, the WCD 230 may be a dual-radio device, having both an LTE radio that the WCD 230 can use to be served by the LTE access network 202, and a CDMA access network 204 that the WCD 230 can use concurrently to be served by the CDMA access network 204. Alternatively, the WCD 230 may include a single radio that supports both LTE service and CDMA service and that the WCD 230 can use to be served concurrently by both access networks. In another example, the WCD 230 may be configured to support being served exclusively by the LTE access network 202. Other configurations are possible as well.

Figure 3:
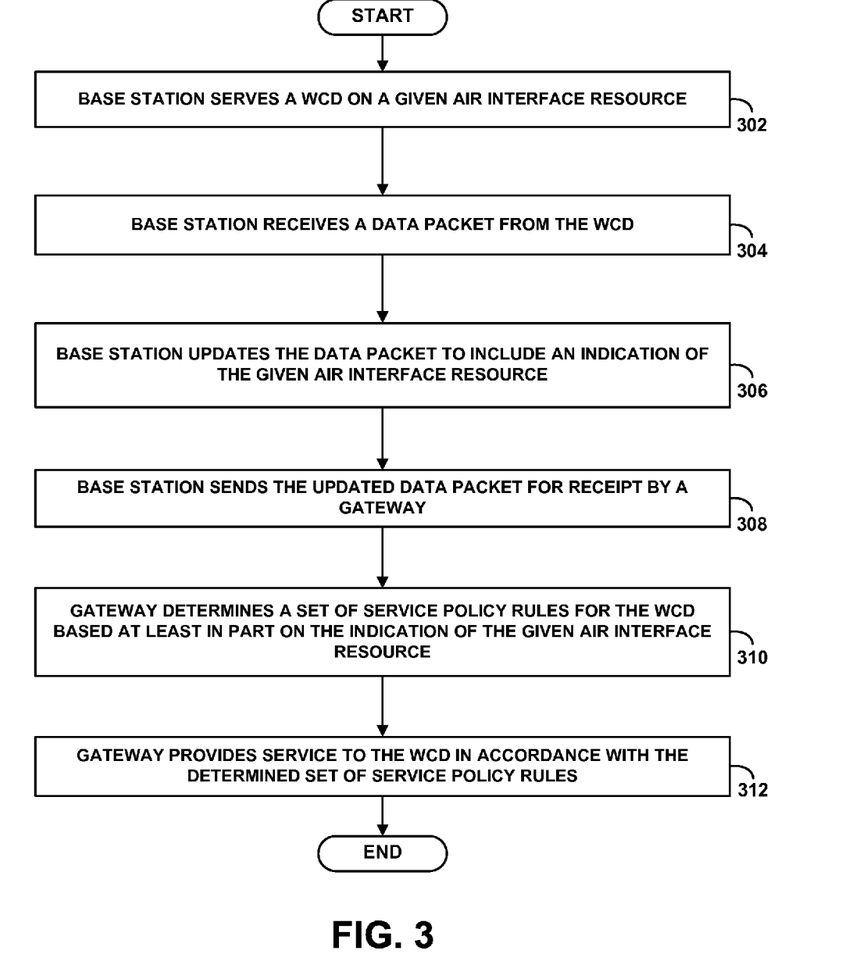
FIG. 3 is a flow chart depicting functions that can be carried out in accordance with example embodiment of the disclosed methods.

Turning now to FIG. 3, a flow chart illustrating functions that can be carried out in accordance with an example embodiment of the disclosed methods is shown. These functions may be carried out by one or more components of an access network, such as the access networks of FIG. 1 and FIG. 2 above.

As shown in FIG. 3, the example embodiment may begin at block 302 with a base station serving a WCD on a given air-interface resource. The base station can take various forms, examples of which include (1) an eNodeB of an LTE access network or (2) a BTS of a CDMA access network, as described above in relation to FIG. 2. Further, depending on air interface protocol employed, the given air-interface resource being used to serve the WCD may take various forms. For instance, the base station may be serving the WCD on a frequency channel that is defined by a carrier frequency (e.g., a particular frequency block in a particular frequency band) on which the frequency channel is employed and perhaps also a particular coverage area in which the frequency channel is provided. Additionally, the base station may also be serving the WCD using a sub-resource on a frequency channel, such as an LTE resource block, a 1×EV-DO timeslot, a Walsh-coded channel, etc. Other examples are possible as well.

The method continues at block 304 with the base station receiving a data packet from the WCD. This data packet may take various forms. In one example, the data packet may include a header and a payload. The header may include information such as the IP address of the WCD, the IP address of the destination of the data packet, among other information. The payload may include the part of the transmitted data which is the fundamental purpose of the transmission. For example, the payload may include the voice data of a cellular call, the text data in a text message, or other data transmitted to or from the WCD. The data packet may take other forms as well.

Next, the method continues at block 306 with the base station updating the data packet to include an indication of the given air-interface resource. The indication of the given air-interface resource may take various forms. In one example, the indication of the given air-interface resource may include an indication of a particular frequency band on which the base station is serving the WCD, such as one of the 800 MHz band, the 1.9 GHz band, and the 2.5 GHz band, as discussed above. In another example, the indication of the given air-interface resource may include an indication of at least one frequency channel on which the base station is serving the WCD (e.g., a carrier frequency and/or a coverage-area identifier). In yet another example, the indication of the given air-interface resource may include an indication of an uplink and/or downlink on which the base station is serving the WCD. In still another example, the indication of the given air-interface resource may include an indication of at least one sub-resource on which the base station is serving the WCD (e.g., an identifier of a resource block, timeslot, etc.). Other examples are possible as well.

Further, the feature of the base station updating the data packet to include an indication of the given air-interface resource may take various forms. In one example, this feature may comprise adding the indication of the given air-interface resource to a header of the data packet. The header may take various forms, including a general packet radio service tunneling protocol (GTP-U) extension header, as an example. In another example, this feature may comprise adding the indication of the given air-interface resource to the payload of the data packet. Other examples are possible as well.

In some implementations, the base station may also update the data packet to include an indication of a load on the given air-interface resource. In one example, the base station may add the indication of the load on the given air-interface resource to a header of the data packet, such as a GTP-U extension header as discussed above. The base station may provide the indication of the load on the given air-interface resource together in the same GTP-U extension header as the indication of the given air-interface resource. In another example, the base station may provide the indication of the load on the given air-interface resource in a GTP-U header of a data packet that is distinct from the received data packet.

It should also be understood that the base station may not update each data packet it receives from the WCD with air-interface resource information. Rather, before updating, the base station may be configured to make a threshold determination of whether to update the received data packet. The base station may carry out this decision in various manners. For example, the base station may decide to include such an indication periodically (e.g., after a given amount of time has passed and/or a given number of data packets have been received since last updating a data packet from the WCD to include such an indication). In another example, the base station may decide to include such an indication only in the first data packet received after the base station begins serving the WCD on a particular air-interface resource. Other examples are possible as well.

The method continues at block 308 with the base station sending the updated data packet for receipt by a gateway. With reference to FIG. 2, in an example LTE system the gateway may include multiple entities, such as a SGW 214 that receives the data packet from the base station (eNodeB 206) and a PGW 216 that receives the data packet from the SGW 214 and provides the WCD with connectivity to a packet-switched network 218. In such an arrangement, the SGW 214 may receive the data packet from the eNodeB 206 via an S1U interface, and the SGW 214 may transmit the data packet to the PGW 216 via an S5 interface or an S8 interface. Other examples are possible as well.

The method continues at block 310 with the gateway determining a set of service policy rules for the WCD based at least in part on the indication of the given air-interface resource. The gateway may make this determination in various manners.

According to one implementation, the gateway may maintain sets of service policy rules that are based on different frequency bands. For instance, the gateway may maintain a first set of service policy rules for the 1.9 GHz band, a second set of service policy rules for the 2.5 GHz band, etc. In this respect, in one representative example, the first set of policy rules may define a lower maximum data rate and/or a lower communication quality than the second set of service policy rules, such that the WCD may be provided with a higher level of service when being served on the 2.5 GHz band. In another example, the first set of service policy rules may define more restrictive permissions than the second set of service policy rules.

In such an implementation, the indication of the given air-interface resource may be compared against those different frequency bands to determine which band the given air-interface resource falls within. If the indication of the given air-interface resource provides that the WCD is being served by the base station on the 1.9 GHz band, the WCD may be configured to operate under the first set of service policy rules. Similarly, if the indication of the given air-interface resource provides that the WCD is being served by the base station on the 2.5 GHz band, the WCD may be configured to operate under the second set of service policy rules. Of course, many other examples of policy rules corresponding to different air-interface resources may exist as well.

In operation, the gateway may determine the set of service policy rules for the WCD in a variety of implementations. In one implementation, an example LTE system may include an SGW 214 that receives the updated data packet from the eNodeB 206 and a PGW 216 that receives the updated data packet from the SGW 214. The PGW 216 may then transmit the updated data packet to a PCRF 222. The PCRF 222 may maintain a service profile record defining one or more service policy rules based at least in part on the air-interface resource on which the WCD is served by the eNodeB 206. The PCRF 222 may be configured to provide the PGW 216 with that service profile data when the WCD attaches to or is served by the LTE access network.

In particular, in one example the PGW 216 may receive from the PCRF 222 a set of service policy rules for the WCD, which may include different rules for different air-interface resources (e.g., different frequency bands or frequency channels). The PGW 216 may maintain a database of such rules locally (e.g., in a context record for the WCD) and may apply those rules as the PGW 216 receives the updated data packet from the SGW 214 including the indication of the given air-interface resource on which the eNodeB 206 is serving the WCD. In another example, the PGW 216 may query the PCRF 222 for a policy directive each time the PGW 216 learns of the air-interface resource on which the WCD is being served by the eNodeB 206. The PCRF 222 may then determine the appropriate set of service policy rules to apply based at least in part on the indication of the given air-interface resource. The PCRF 222 may then provide a directive to the PGW 216 including the appropriate set of service policy rules for the PGW 216 to implement.

Further, as discussed above, the example embodiment may additionally include the base station further updating the data packet to include an indication of a load on the given air-interface resource. In such an example, the gateway may determine the set of service policy rules for the WCD based at least in part on either the indication of the given air-interface resource, the indication of the load on the given air-interface resource, or both. Using the LTE example above, the eNodeB 206 may provide the SGW 214, and responsively the PGW 216, with an indication of the current load on the given air-interface resource being used to serve the WCD. The PGW 216 (per locally stored policy rules or per directive from the PCRF 222 in response to a query to the PCRF 222) may apply the set of policy rules for the WCD based on the determined load and/or the fact that the WCD is being served on the given air-interface resource.

The method continues at block 312 with the gateway providing service to the WCD in accordance with the determined set of service policy rules. As noted above, these service policy rules may define a quality of service to be provided to the WCD, as well as other restrictions, allowances, and rules regarding configuration and operation of the access network when serving the WCD.

Figure 4:
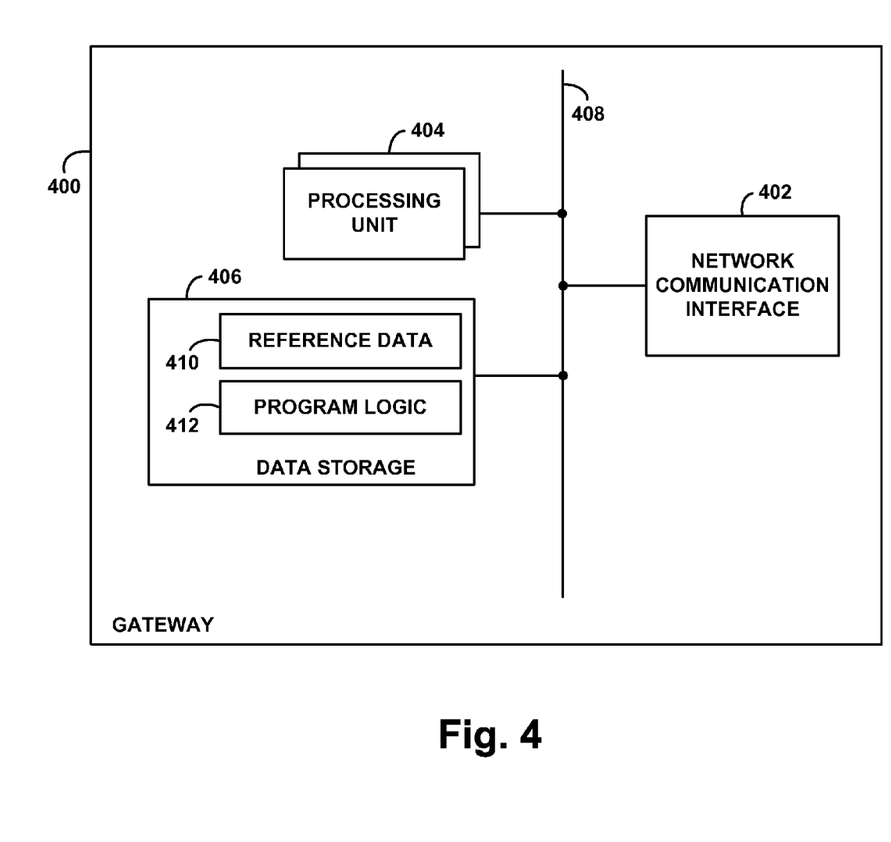
FIG. 4 is a simplified block diagram showing functional components that may be included in example gateway to facilitate implementation of the disclosed methods.

FIG. 4 is next a simplified block diagram depicting components of an example gateway 400 that may be arranged to carry out various aspects of the disclosed methods. As shown in FIG. 4, gateway 400 includes a network communication interface 402, a processing unit 404, and data storage 406, all of which may be communicatively linked together by a system bus, network, or other connection mechanism 408.

In this example arrangement, network communication interface 402 functions to facilitate communication with various other entities of the system. As such, the interface may include a wired or wireless Ethernet module or other interface, depending on the manner in which communication will occur. Processing unit 404 may then comprise one or more general purpose processors (e.g., microprocessors) and/or one or more special purpose processors (e.g., application specific integrated circuits or digital signal processors). And data storage 406 may comprise one or more volatile and/or non-volatile storage components (non-transitory), such as magnetic, optical, flash, or organic storage components.

As shown, data storage 406 may contain reference data 410 and program logic 412. Reference data 410 may comprise various data usable by processing unit 404 to carry out various functions described herein. For example, reference data 410 may comprise service profile data for each of various air-interface resources and may thus define for each WCD one or more service policy rules based at least in part by an indication of the frequency on which the WCD is being served. Program logic 412, in turn, may then comprise machine language instructions or the like that are executable by the processing unit 404 to carry out various functions described herein, such as to receive a data packet from a base station and responsively provide one or more service policy rules for the WCD based at least in part by an indication of the air-interface resource on which the WCD is being served.

Figure 5:
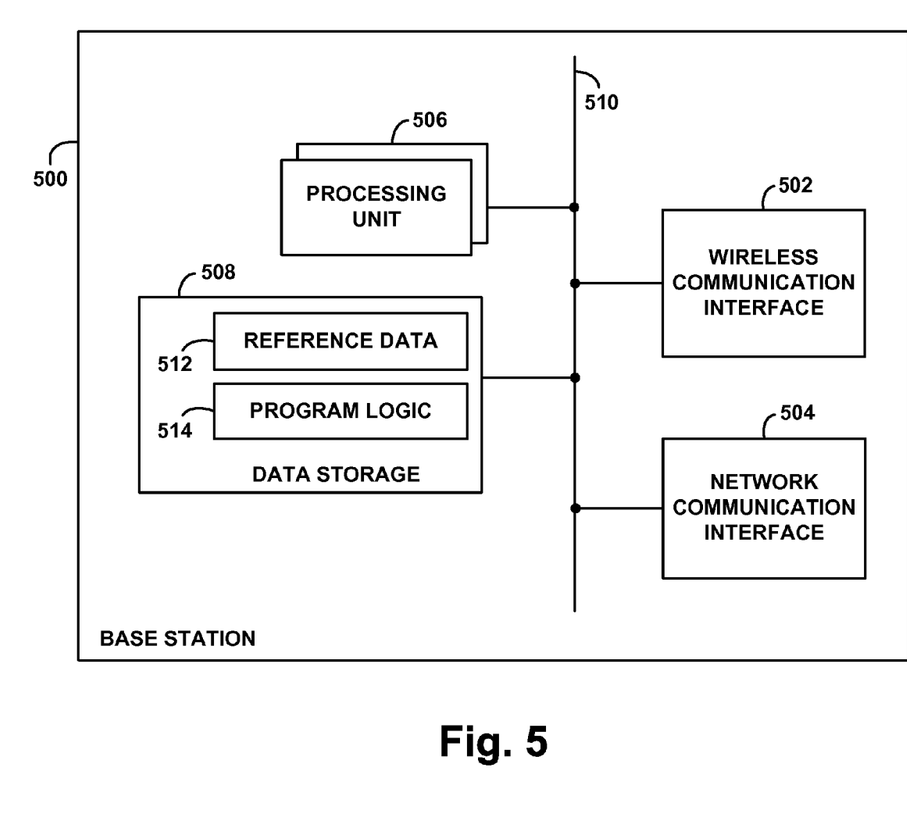
FIG. 5 is a simplified block diagram showing functional components that may be included in example base station to facilitate implementation of the disclosed methods.

FIG. 5 is a simplified block diagram depicting components of an example base station 500 that may be arranged to carry out various aspects of the disclosed methods. As shown, the example base station 500 includes a wireless communication interface 502, a network communication interface 504, a processing unit 506, and data storage 508, all of which may be communicatively linked together by a system bus, network, or other connection mechanism 510.

In this example arrangement, wireless communication interface 502 generally functions to radiate to define one or more coverage areas in which WCDs can operate and engage in wireless communication with base station 500 over an air interface. As such, wireless communication interface 502 may include one or more antenna structures arranged in various ways (e.g., one or more directional or sectored antennas that are potentially tower mounted). Additionally, wireless communication interface 502 may include other associated components, such as a power amplifier and/or a modem for instance. Other configurations are also possible.

Network communication interface 504 generally functions to facilitate communication with one or more access networks, such as those discussed above for instance, and may thus take various forms to facilitate various types of communication such as wireless, landline, circuit-switched, and/or packet-switched communication. Network communication interface 504 may take any suitable form for carrying out this function, examples of which include an Ethernet interface, a serial bus interface (e.g., Firewire, USB 2.0, etc.), a chipset and antenna adapted to facilitate wireless communication, and/or any other interface that provides for wired and/or wireless communication. Network communication interface 504 may also include multiple interfaces. Other configurations are possible as well.

Processing unit 506 may comprise one or more general purpose processors (e.g., microprocessors) and/or one or more special purpose processors (e.g., application specific integrated circuits or digital signal processors), programmable-logic devices (e.g., a field programmable gate array), and/or any other processor components now known or later developed. Processing unit 506 may be integrated in whole or in part with other components of base station 500.

Data storage 508 may then comprise one or more volatile and/or non-volatile storage components (non-transitory), such as magnetic, optical, flash, or organic storage components. As shown, data storage 508 may be arranged to contain reference data 512 and program logic 514. Reference data 512 may comprise various data usable by processing unit 506 to carry out various functions described herein. Program logic 514 may then comprise machine language instructions or the like that may be executed or interpreted by processing unit 506 to carry out various functions described herein.

Exemplary embodiments have been described above. Those skilled in the art will appreciate, however, that many variations from the embodiments are possible while remaining within the spirit and scope of the claims.

What is claimed is:

1. A method comprising:
   a base station serving a wireless communication device (WCD) on a given air-interface resource;
   while serving the WCD, the base station receiving a data packet from the WCD;
   after receiving the data packet, the base station updating the data packet to include an indication of the given air-interface resource, wherein the indication of the given air-interface resource includes at least one indication selected from the group consisting of a frequency band, a frequency channel, and an Orthogonal Frequency Division Multiple Access (OFDMA) resource block; and
   the base station transmitting the updated data packet for receipt by one or more gateways.

2. The method of claim 1, wherein updating the data packet to include an indication of the given air-interface resource comprises adding the indication of the given air-interface resource to a header of the data packet.

3. The method of claim 2, wherein the header of the data packet comprises a general packet radio service tunneling protocol (GTP-U) extension header.

4. The method of claim 1, further comprising:
   the one or more gateways receiving the updated data packet; and
   the one or more gateways determining a set of service policy rules for the WCD based at least in part on the indication of the given air-interface resource.

5. The method of claim 1, further comprising:
   a serving gateway (SGW) receiving the updated data packet from the base station;
   the SGW transmitting the updated data packet to a packet gateway (PGW);
   the PGW transmitting the updated data packet to a policy charging and rules function (PCRF);
   the PCRF transmitting the determined set of service policy rules to the PGW; and
   the PGW providing service to the WCD in accordance with the determined set of service policy rules.

6. The method of claim 5, wherein the indication of the given air-interface resource comprises an indication of a given frequency band, wherein the set of service policy rules is maintained by the PGW for one or more frequency bands, and wherein determining the set of service policy rules for the WCD comprises comparing the indication of the given frequency band to the one or more frequency bands to determine which frequency band the given frequency band falls within.

7. The method of claim 5, wherein determining the set of service policy rules comprises obtaining the set of service policy rules from a database of policy rules maintained by the PGW.

8. The method of claim 5, wherein determining the set of service policy rules comprises:
   sending a request for the set of service policy rules to the PCRF, wherein the request includes the indication of the given air-interface resource; and
   as a result of sending the request, receiving the set of service policy rules from the PCRF.

9. The method of claim 1, wherein the indication of the given air-interface resource comprises a frequency band or a frequency channel, the method further comprising:
   before transmitting the updated data packet for receipt by the one or more gateways, the base station further updating the data packet to include an indication of a load on the given air-interface resource.

10. The method of claim 9, further comprising:
    the one or more gateways receiving the updated data packet; and
    the one or more gateways determining a set of service policy rules for the WCD based on the indication of the load of the given air-interface resource.

11. A method comprising:
    at a gateway that provides connectivity between an access network and a transport network, receiving a data packet originated by a wireless communication device (WCD) being served by the access network, wherein the data packet includes an indication of a given air-interface resource on which the access network is serving the WCD, and wherein the indication of the given air-interface resource includes at least one indication selected from the group consisting of a frequency band, a frequency channel, and an Orthogonal Frequency Division Multiple Access (OFDMA) resource block;
    the gateway determining a set of service policy rules for the WCD based at least in part on the indication of the given air-interface resource; and the gateway providing service to the WCD in accordance with the determined set of service policy rules.

12. The method of claim 11, wherein the indication of the given air-interface resource comprises a frequency band or a frequency channel, wherein the data packet further includes an indication of a load of the given air-interface resource, and wherein the gateway determining a set of service policy rules for the WCD based at least in part on the indication of the given air-interface resource comprises the gateway determining the set of service policy rules for the WCD based on at least both the indication of the given air-interface resource and the indication of the load of the given air-interface resource.

13. The method of claim 11, wherein the indication of the given air-interface resource is included in a header of the data packet.

14. A base station comprising:
   a network communication interface configured to provide connectivity with a wireless carrier network;
   a processing unit;
   data storage; and
   program instructions stored in the data storage and executable by the processing unit to carry out functions comprising:
      serving a wireless communication device (WCD) on a given air-interface resource;
      while serving the WCD, receiving a data packet from the WCD;
      after receiving the data packet, updating the data packet to include an indication of the given air-interface resource, wherein updating the data packet to include an indication of the given air-interface resource comprises adding the indication of the given air-interface resource to a header of the data packet, and wherein the indication of the given air-interface resources includes at least one indication selected from the group consisting of a frequency band, a frequency channel, and an Orthogonal Frequency Division Multiple Access (OFDMA) resource block; and
      transmitting the updated data packet for receipt by one or more gateways.

15. The base station of claim 14, wherein the indication of the given air-interface resource comprises a frequency band or a frequency channel, and wherein the functions further comprise updating the data packet to include an indication of the load of the given air-interface resource.

* * * * *